US009720940B2

(12) United States Patent
Aliferis et al.

(10) Patent No.: US 9,720,940 B2
(45) Date of Patent: Aug. 1, 2017

(54) DATA ANALYSIS COMPUTER SYSTEM AND METHOD FOR PARALLELIZED AND MODULARIZED ANALYSIS OF BIG DATA

(71) Applicants: Konstantinos (Constantin) F. Aliferis, Astoria, NY (US); Alexander Statnikov, New York, NY (US)

(72) Inventors: Konstantinos (Constantin) F. Aliferis, Astoria, NY (US); Alexander Statnikov, New York, NY (US)

( * ) Notice: Subject to any disclaimer, the term of this patent is extended or adjusted under 35 U.S.C. 154(b) by 89 days.

(21) Appl. No.: 14/217,391

(22) Filed: Mar. 17, 2014

(65) Prior Publication Data
US 2014/0280257 A1 Sep. 18, 2014

Related U.S. Application Data

(60) Provisional application No. 61/798,944, filed on Mar. 15, 2013, provisional application No. 61/792,977, filed on Mar. 15, 2013.

(51) Int. Cl.
*G06F 17/10* (2006.01)
*G06F 17/30* (2006.01)

(52) U.S. Cl.
CPC .. *G06F 17/30292* (2013.01); *G06F 17/30445* (2013.01); *G06F 17/30566* (2013.01); *G06F 17/30584* (2013.01)

(58) Field of Classification Search
CPC .............. G06F 17/30; G06F 17/30292; G06F 17/30445; G06F 17/30566; G06F 17/30584; G06F 17/10
(Continued)

(56) References Cited

U.S. PATENT DOCUMENTS 9,098,326 B1* 8/2015 Martin ..................... G06N 5/00
2004/0122790 A1* 6/2004 Walker ................ G06F 19/3443
(Continued)

OTHER PUBLICATIONS

Aliferis et al, "Local Causal and Markov Blanket Induction for Causal Discovery and Feature Selection for Classification Part I: Algorithms and Empirical EvaluationAn Extended Data", Journal of Machine Learning Research 11 (2010), Jan. 2010, pp. 171-234.*
(Continued)

*Primary Examiner* — Tony Mahmoudi
*Assistant Examiner* — Kamal Dewan
(74) *Attorney, Agent, or Firm* — Laurence Weinberger

(57) ABSTRACT

The focus of the present invention is the modular analysis of Big Data encompassing parallelization, chunking, and distributed analysis applications. Typical application scenarios include: (i) data may not reside in one database but alternatively exist in more non-identical databases, and analysis has to take place in situ rather than combining all databases in one big database; (ii) data exceeding the working memory of the largest available computer and has to be broken into smaller pieces that need be analyzed separately and the results combined; (c) data encompassing several distinct data types that have to be analyzed separately by methods specific to each data type, and the results combined; (iv) data encompassing several distinct data types that have to be analyzed separately by analyst with knowledge/skills specific to each data type, and the results combined; and (v) data analysis that has to take place over time as new data is coming in and results are incrementally improved until analysis objectives are met, or no more data is available. The present Big Data Parallelization/Modularization data analysis system and method—"BDP/M")) is implemented in general purpose digital computers and is capable of dealing with the above scenarios of Big Data analysis as well as any scenario where parallel, distributed, federated, chunked and
(Continued)

BDP/M description of general method

1. Inputs: dataset D, analysis modules set A, termination criterion
2. D is broken down into $n$ subsets Di *according* to a *Distribution Sub-Procedure* (implemented in a corresponding module)
3. Subsets of Di, di are extracted from each Di and used to form $Di^j$ for all Di according to a *Mixing Sub-Procedure* (implemented in a corresponding module)
4. Analyses from A are performed on $Di^j$
5. Steps 2-4 are repeated according to an *Iterative Enhancement Sub-Procedure* (implemented in a corresponding module) that also contains termination and performance criteria
6. Results from individual $Di^j$ are combined by a *Combinator Sub-Procedure*, (implemented in a corresponding module) and output by the system serialized Big Data analysis is desired without compromising efficiency and correctness.

24 Claims, 15 Drawing Sheets

(58) Field of Classification Search
USPC .............. 707/755, 811, E17.005, E17.045, 707/E17.089; 702/20, 181, 183; 703/2
See application file for complete search history.

(56) References Cited

U.S. PATENT DOCUMENTS

| | | | | |
|---|---|---|---|---|
| 2007/0040094 A1* | 2/2007 | Smith | ............. | G06K 9/6253 250/202 |
| 2010/0217599 A1* | 8/2010 | Statnikov | ............. | G10L 15/142 704/256 |
| 2011/0191361 A1* | 8/2011 | Gupta | ............. | G06F 17/30424 707/763 |
| 2011/0202322 A1* | 8/2011 | Statnikov | ............. | G06N 99/005 703/2 |
| 2011/0307437 A1* | 12/2011 | Aliferis | ............. | G06N 99/005 706/52 |
| 2014/0089331 A1* | 3/2014 | Sun | ............. | G06F 17/30283 707/752 |
| 2014/0165154 A1* | 6/2014 | Giblin | ............. | H04L 63/10 726/4 |
| 2014/0280142 A1* | 9/2014 | Wasson | ............. | G06F 17/30539 707/737 |

OTHER PUBLICATIONS

Aliferis et al, "Local Causal and Markov Blanket Induction for Causal Discovery and Feature Selection for Classification Part II: Analysis and Extensions", Journal of Machine Learning Research 11 (2010), Jan. 2010, pp. 235-284.*

* cited by examiner

BDP/M description of general method

1. Inputs: dataset D, analysis modules set A, termination criterion
2. D is broken down into $n$ subsets Di *according* to a *Distribution Sub-Procedure* (implemented in a corresponding module)
3. Subsets of Di, di are extracted from each Di and used to form $Di^j$ for all Di according to a *Mixing Sub-Procedure* (implemented in a corresponding module)
4. Analyses from A are performed on $Di^j$
5. Steps 2-4 are repeated according to an *Iterative Enhancement Sub-Procedure* (implemented in a corresponding module) that also contains termination and performance criteria
6. Results from individual $Di^j$ are combined by a *Combinator Sub-Procedure*, (implemented in a corresponding module) and output by the system

Figure 1

Admissibility criteria (i.e., configuration rules) that guarantee optimal feature selection/data compression for predictive model construction

*Data Distribution*
- All faithful distributions

*Analysis modules set A*
- Any proper Markov Boundary induction method (e.g., GLL-MB [6], IAMB [12, 13]);
- Extract $MBi^j$ from each $Di^j$

*Distribution Sub-Procedure*
- Create union of all $Di^j$ forms D
- Ensure one-to-one correspondence of each observable unit in each Di

*Mixing Sub-Procedure*
- Add $MBi^{(j-1)}$ to each $Di^{(j-1)}$ to form $Di^j$

*Iterative Enhancement Sub-Procedure*
- Terminate at or after smallest number of iterations that guarantees no false negatives and no false positives are produced by application of local analyses

*Combinator Sub-Procedure*
- Create union of all local Markov Boundaries discovered in last iteration
- Remove any remaining false positives via application of Analysis set A //If the above admissibility rules do not hold the process may still output correct results and/or heuristically useful results.

Figure 2

Admissibility criteria (i.e., configuration rules) that guarantee correct local causal neighborhood discovery

*Data Distribution*
- All locally faithful distributions with local causal sufficiency

*Analysis set A*
- Any proper local causal induction method (e.g., GLL-PC [6], PC [14], IC* [15], FCI [14]);
- Extract $LNi^j$ from each $Di^j$

*Distribution Sub-Procedure*
- Union of all $Di^j$ forms D
- One-to-one correspondence of each observable unit in each Di

*Mixing Sub-Procedure*
- Add $LNi^{(j-1)}$ to each $Di^{(j-1)}$ to form $Di^j$

*Iterative Enhancement Sub-Procedure*
- Terminate at or after smallest number of iterations that guarantees no false negatives and no false positives are produced by application of local analyses

*Combinator Sub-Procedure*
- Create union of all Local Neighborhoods discovered in last iteration
- Remove any remaining false positives via application of Analysis set A //If the above admissibility rules do not hold the process may still output correct results and/or heuristically useful results.

Figure 3

Admissibility rules criteria (i.e., configuration rules) that guarantee correct extraction of all maximally predictive and non variable-compressible predictive models

*Data Distribution*
- All distributions where faithfulness holds except for violations of the intersection property

*Analysis modules set A*
- Apply TIE* multiple Markov Boundary induction method
- Extract the set of MBi$^j$ from each Di$^j$

*Distribution Sub-Procedure*
- Create union of all Di$^j$ forms D
- Ensure one-to-one correspondence of each observable unit in each Di

*Mixing Sub-Procedure*
- Add the set MBi$^{(j-1)}$ to each Di$^{(j-1)}$ to form Di$^j$

*Iterative Enhancement Sub-Procedure*
- Terminate at or after smallest number of iterations that guarantees no false negatives and no false positives are produced by application of local analyses

*Combinator Sub-Procedure*
- Create union of all local Markov Boundaries discovered in last iteration
- Remove any remaining false positives via application of Analysis set A //If the above admissibility rules do not hold the process may still output correct results and/or heuristically useful results.

Figure 4

Example configuration: Federated GLL-MB, Federated GLL

Inputs: dataset D, A= GLL-MB (or GLL)

*Configuration*

1. *Termination Sub-Procedure* = terminate upon 2 iterations
2. *Distribution Sub-Procedure* = D exists naturally in $n$ subsets Di
3. *Mixing Sub-Procedure* = extract $MBi^j$ by applying GLL-MB on $Di^j$ then add to each $Di^j$ all $MBi^j$
4. *Combinator Sub-Procedure*, run GLL-MB on union of $MBi^j$ and return results to user

*Admissibility*

*Data Distribution*
- All faithful distributions: by selection of appropriate data

*Analysis set A*
- By definition of configuration inputs

*Distribution Sub-Procedure*
  o By definition of Distribution *Sub-Procedure*

*Mixing Sub-Procedure*
- By definition of Mixing *Sub-Procedure*

*Iterative Enhancement Sub-Procedure*
- At first iteration there will be no false positives but some false negatives because unconnected spouses cannot be identified. At second iteration because common children of spouses are previously identified and distributed to all $Di^j$, no false negatives and no false positives will occur.

*Combinator Sub-Procedure*
- By definition of Combinator *Sub-Procedure*

Figure 5

Method PGLL1

Input:
- dataset D for variables $V$, including a response variable $T$;
- parameter *max-k* (non-negative integer) limiting the size of the conditioning set.

Output: a Markov boundary $M$ of $T$.

*Phase I: Forward*
1. $M \leftarrow \emptyset$ // Initialize Markov boundary
2. $E \leftarrow V \setminus \{T\}$ // This is the set of all eligible variables
3. $C[1] \leftarrow \emptyset$
4. While 1
5.     PFor each $X \in E$
6.         PFor $i = 1$ to $|C|$
7.             If $T \perp X \mid C[i]$ then $E \leftarrow E \setminus \{X\}$
8.         End
9.     End
10.     If *max-k* = 0 then // Exit condition #1
11.         $M \leftarrow E$
12.         Return $M$ and terminate.
13.     End
14.     If $E$ is empty then break // Exit condition #2
15.     $Y \leftarrow \mathrm{argmax}_{X \in E}$ Association$(T, X)$
16.     $C \leftarrow$ (all subsets of $M$ of size up to *max-k* $-$ 1) $\cup \{Y\}$ // Sorted based on size
17.     $M \leftarrow M \cup \{Y\}$
18.     $E \leftarrow E \setminus \{Y\}$
19. End

*Phase II: Backward*

20. PFor each $X \in M$
21.     $C \leftarrow$ all non-empty subsets of $M \setminus \{X\}$ of size up to *max-k*
22.     PFor $i = 1$ to $|C|$
23.         If $T \perp X \mid C[i]$ then $M \leftarrow M \setminus \{X\}$
24.     End
25. End
26. Output $M$

Figure 6

Method PGLL2

Input:
- dataset D for variables $V$, including a response variable $T$;
- parameter *max-k* (non-negative integer) limiting the size of the conditioning set.

Output: a Markov boundary $M$ of $T$.

*Phase I: Forward*
1. $M \leftarrow \emptyset$ // Initialize Markov boundary
2. $E \leftarrow V \setminus \{T\}$ // This is the set of all eligible variables
3. $C[1] \leftarrow \emptyset$
4. While 1
5.     $R \leftarrow \emptyset$ // Set of variables to remove
6.     PFor $i = 1$ to $|C|$
7.        $R \leftarrow R \cup \{X \in E: T \perp X \mid C[i] \}$
8.     End
9.     $E \leftarrow E \setminus R$
10.     If *max-k* = 0 then // Exit condition #1
11.        $M \leftarrow E$
12.        Return $M$ and terminate.
13.     End
14.     If $E$ is empty then break // Exit condition #2
15.     $Y \leftarrow \mathrm{argmax}_{X \in E}$ Association($T$, $X$)
16.     $C \leftarrow$ (all subsets of $M$ of size up to *max-k* – 1) $\cup \{Y\}$ // Sorted based on size
17.     $M \leftarrow M \cup \{Y\}$
18.     $E \leftarrow E \setminus \{Y\}$
19. End

*Phase II: Backward*

20. $C \leftarrow$ all non-empty subsets of $M$ of size up to *max-k*
21. $R \leftarrow \emptyset$ // Set of variables to remove
22. PFor $i = 1$ to $|C|$
23.     $R \leftarrow R \cup \{X \in M \setminus C[i]: T \perp X \mid C[i] \}$
24. End
25. $M \leftarrow M \setminus R$
26. Output $M$

Figure 7

| Ecoli, TF 1245 | | | | | | |
|---|---|---|---|---|---|---|
| N obs | Parameter | Sensitivity | LN | TP | FP | FN |
| 4000 | max-k=2 | 0.9814 | 54 | 53 | 0 | 1 |
| | max-k=3 | 0.9629 | 54 | 52 | 0 | 2 |

| Yeast, TF 1201 | | | | | | |
|---|---|---|---|---|---|---|
| N obs | Parameter | Sensitivity | LN | TP | FP | FN |
| 4000 | max-k=2 | 0.84 | 300 | 252 | 27 | 48 |
| | max-k=3 | 0.74 | 300 | 222 | 9 | 78 |

Figure 8

| | Ecoli, TF 1245 | | | | | |
|---|---|---|---|---|---|---|
| | N obs | Parameter | Forward phase | Backward phase | Total | Improvement |
| Semi-Interlevaed HITON-PC, single core | 4000 | max-k=2 | 13 | 39 | 52 | 1.00 |
| | | max-k=3 | 203 | 837 | 1,040 | 1.00 |
| | Yeast, TF 1201 | | | | | |
| | N obs | Parameter | Forward phase | Backward phase | Total | Improvement |
| | 4000 | max-k=2 | 2125 | 6,536 | 8,661 | 1.00 |
| | | max-k=3 | 72471 | 260,972 | 333,443 | 1.00 |
| | Ecoli, TF 1245 | | | | | |
| | N obs | Parameter | Forward phase | Backward phase | Total | Improvement |
| PGLL1, single core | 4000 | max-k=2 | 13 | 36 | 49 | 1.06 |
| | | max-k=3 | 173 | 587 | 760 | 1.37 |
| | Yeast, TF 1201 | | | | | |
| | N obs | Parameter | Forward phase | Backward phase | Total | Improvement |
| | 4000 | max-k=2 | 2331 | 4,852 | 7,183 | 1.21 |
| | | max-k=3 | 82194 | 226,847 | 309,041 | 1.08 |
| | Ecoli, TF 1245 | | | | | |
| | N obs | Parameter | Forward phase | Backward phase | Total | Improvement |
| PGLL2, single core | 4000 | max-k=2 | 3.5 | 7 | 11 | 4.95 |
| | | max-k=3 | 32 | 125 | 157 | 6.62 |
| | Yeast, TF 1201 | | | | | |
| | N obs | Parameter | Forward phase | Backward phase | Total | Improvement |
| | 4000 | max-k=2 | 801 | 2,005 | 2,806 | 3.09 |
| | | max-k=3 | 20558 | 82,340 | 102,898 | 3.24 |
| | Ecoli, TF 1245 | | | | | |
| | N obs | Parameter | Forward phase | Backward phase | Total | Improvement |
| PGLL2, 6 cores | 4000 | max-k=2 | 20.7 | 2 | 22 | 2.32 |
| | | max-k=3 | 23.6 | 24 | 48 | 21.80 |
| | Yeast, TF 1201 | | | | | |
| | N obs | Parameter | Forward phase | Backward phase | Total | Improvement |
| | 4000 | max-k=2 | 383.4 | 386 | 769 | 11.26 |
| | | max-k=3 | 4474.8 | 15,274 | 19,749 | 16.88 |
| | Ecoli, TF 1245 | | | | | |
| PGLL3, GPU (batch size 500) | N obs | Parameter | Forward phase | Backward phase | Total | Improvement |
| | 4000 | max-k=2 | 13.2 | 1 | 14 | 3.64 |
| | | max-k=3 | 13.2 | 34 | 47 | 22.08 |
| PGLL3, GPU (batch size 100) | Yeast, TF 1201 | | | | | |
| | N obs | Parameter | Forward phase | Backward phase | Total | Improvement |
| | 4000 | max-k=2 | 73.4 | 111 | 185 | 46.94 |
| | | max-k=3 | 1846.2 | 29,208 | 31,054 | 10.74 |

| | TCGA-Breast Cancer 1 | | | | | TCGA-Breast Cancer 2 | | | | |
|---|---|---|---|---|---|---|---|---|---|---|
| | R1 | R2 | R3 | R4 | R5 | R1 | R2 | R3 | R4 | R5 |
| Unimodal, GLL feature selection | | | | | | | | | | |
| clinical | 1 | 1 | 1 | 2 | 2 | 0 | 0 | 2 | 1 | 1 |
| gene_expression | 198 | 199 | 176 | 297 | 286 | 130 | 125 | 113 | 178 | 145 |
| protein_expression | 1 | 2 | 2 | 8 | 6 | 0 | 0 | 0 | 5 | 3 |
| somatic_mutations | 7 | 17 | 20 | 15 | 11 | 5 | 11 | 15 | 10 | 7 |
| dna_methylation | 45 | 39 | 27 | 235 | 197 | 208 | 235 | 172 | 212 | 201 |
| Unimodal, SVM-RFE feature selection | | | | | | | | | | |
| clinical | 9 | 12 | 13 | 11 | 12 | 9 | 11 | 12 | 11 | 10 |
| gene_expression | 4,359 | 985 | 2,154 | 1,005 | 318 | 1,360 | 368 | 755 | 2,732 | 9 |
| protein_expression | 37 | 24 | 35 | 10 | 26 | 17 | 23 | 16 | 21 | 20 |
| somatic_mutations | 693 | 578 | 384 | 2,230 | 2,365 | 1,354 | 1,512 | 1,060 | 864 | 492 |
| dna_methylation | 2,306 | 2,934 | 361 | 901 | 2,016 | 22,291 | 39,080 | 45,152 | 6,975 | 20,476 |
| Multi-modal | | | | | | | | | | |
| variant of BDP/M with GLL | 252 | 258 | 225 | 558 | 502 | 343 | 372 | 302 | 407 | 357 |
| GLL on all data modalities | 228 | 229 | 192 | 395 | 363 | 294 | 317 | 250 | 321 | 287 |
| variant of BDP/M with SVM-RFE | 7,404 | 4,534 | 2,947 | 4,158 | 4,736 | 25,032 | 40,994 | 46,995 | 10,602 | 21,007 |
| SVM_RFE on all data modalities | 4,633 | 2,879 | 2,094 | 989 | 1,410 | 23,309 | 45,013 | 16,078 | 17,052 | 4,378 |

| | TCGA-Ovarian Cancer | | | |
|---|---|---|---|---|
| | R1 | R2 | R3 | R4 |
| clinical | 0 | 2 | 1 | 0 |
| gene_expression | 135 | 506 | 291 | 56 |
| protein_expression | 1 | 1 | 1 | 1 |
| miRNA | 14 | 33 | 25 | 14 |
| dna_methylation | 32 | 78 | 64 | 25 |
| clinical | 11 | 16 | 11 | 6 |
| gene_expression | 5,993 | 13,611 | 3,917 | 1,237 |
| protein_expression | 61 | 47 | 20 | 15 |
| miRNA | 624 | 165 | 485 | 113 |
| dna_methylation | 305 | 5,210 | 1,855 | 478 |
| variant of BDP/M with GLL | 183 | 621 | 382 | 96 |
| GLL on all data modalities | 154 | 588 | 341 | 72 |
| variant of BDP/M with SVM-RFE | 6,994 | 19,050 | 6,287 | 1,848 |
| SVM_RFE on all data modalities | 4,285 | 7,323 | 4,040 | 1,072 |

| | MSKCC-Prostate Cancer | | | Neomark |
|---|---|---|---|---|
| | R1 | R2 | R3 | R1 |
| clinical | 1 | 2 | 0 | 1 |
| gene_expression | 26 | 23 | 13 | 36 |
| copy_number | 9 | 15 | 5 | |
| miRNA | 4 | 8 | 3 | |
| tumor_imaging | | | | 2 |
| clinical | 4 | 4 | 3 | 13 |
| gene_expression | 40 | 1 | 123 | 546 |
| copy_number | 558 | 416 | 617 | |
| miRNA | 41 | 3 | 59 | |
| tumor_imaging | | | | 8 |
| variant of BDP/M with GLL | 39 | 48 | 21 | 40 |
| GLL on all data modalities | 30 | 27 | 15 | 36 |
| variant of BDP/M with SVM-RFE | 643 | 424 | 803 | 567 |
| SVM_RFE on all data modalities | 38 | 1 | 917 | 67 |

Figure 11

TCGA-Breast Cancer

| Name | Definition |
|---|---|
| R1 | Neoplasm disease stages I*, II* (0) vs. III*, IV* (1) |
| R2 | Lymph node stage N0* (0) vs. N1*, N2*, N3* (1) |
| R3 | Tumor stages T1*, T2* (0) vs. T3*, T4* (1) |
| R4 | Estrogen receptor negative (0) vs. positive (1) |
| R5 | Progesterone receptor negative (0) vs. positive (1) |

TCGA-Ovarian Cancer

| Name | Definition |
|---|---|
| R1 | Lymphatic invasion |
| R2 | Neoplasm histologic |
| R3 | Tumor stages T1*, T2* (0) vs. T3*, T4* (1) |
| R4 | Estrogen receptor negative (0) vs. positive (1) |

MSKCC-Prostate Cancer

| Name | Response |
|---|---|
| R1 | Lymph node stage N0 (0) vs. N1 (1) |
| R2 | Primary (0) vs. metastatic (1) |
| R3 | Tumor stages T1 (0) vs. T2, T3, T4 (1) |

Neomark

| Name | Response |
|---|---|
| R1 | Relapse (1) vs. no relapse (1) of oral squamous cell carcinoma |

Figure 12

*Markov Boundary Induces and Variable Selection Methods*

| Classifiers | IAMB, FGP-IAMB | CD-IAMB, CP-IAMB | SVM-RFE | UAF, All variables |
|---|---|---|---|---|
| KNN | 0.91 | 0.90 | 0.84 | 0.87 |
| Linear SVMs | 0.85 | 0.84 | 0.89 | 0.89 |
| Polynomial SVMs | 0.86 | 0.89 | 0.88 | 0.90 |
| RBF SVMs | 0.82 | 0.83 | 0.92 | 0.92 |
| Naïve Bayes | 0.96 | 0.92 | 0.60 | 0.82 |
| NNs | 0.84 | 0.88 | 0.87 | - |
| *Average AUC over all classifiers* | 0.87 | 0.88 | 0.83 | - |
| *Number of selected variables* | 8 | 8 | 2177 | 139,351 |

Figure 13

| IAMB method | Running time (hours) | Number of CPU's |
|---|---|---|
| IAMB | 72 | 1 |
| FGP-IAMB | 0.50 | 14 |
| CP-IAMB | 0.53 | 14 |
| CD-IAMB | 6.69 | 1 |

Figure 14

DATA ANALYSIS COMPUTER SYSTEM AND METHOD FOR PARALLELIZED AND MODULARIZED ANALYSIS OF BIG DATA

Benefit of U.S. Provisional Application No. 61/792,977 filed on Mar. 15, 2013 is hereby claimed.

BACKGROUND OF THE INVENTION

Field of Application

The field of application of the invention is data analysis especially as it applies to (so-called) "Big Data" (see sub-section 1 "Big Data and Big Data Analytics" below). The methods, systems and overall technology and knowhow needed to execute data analyses is referred to in the industry by the term data analytics. Data analytics is considered a key competency for modern firms [1]. Modern data analytics technology is ubiquitous (see sub-section 3 below "Specific examples of data analytics application areas"). Data analytics encompasses a multitude of processes, methods and functionality (see sub-section 2 below "Types of data analytics").

Data analytics cannot be performed effectively by humans alone due to the complexity of the tasks, the susceptibility of the human mind to various cognitive biases, and the volume and complexity of the data itself. Data analytics is especially useful and challenging when dealing with hard data/data analysis problems (which are often described by the term "Big Data"/"Big Data Analytics" (see sub-section 1 "Big Data and Big Data Analytics").

1. Big Data and Big Data Analytics

Big Data Analytics problems are often defined as the ones that involve Big Data Volume, Big Data Velocity, and/or Big Data Variation [2].

Big Data Volume may be due to large numbers of variables, or big numbers of observed instances (objects or units of analysis), or both.

Big Data Velocity may be due to the speed via which data is produced (e.g., real time imaging or sensor data, or online digital content), or the high speed of analysis (e.g., real-time threat detection in defense applications, online fraud detection, digital advertising routing, high frequency trading, etc.).

Big Data Variation refers to datasets and corresponding fields where the data elements, or units of observations can have large variability that makes analysis hard. For example, in medicine one variable (diagnosis) may take thousands of values that can further be organized in interrelated hierarchically organized disease types.

According to another definition, the aspect of data analysis that characterizes Big Data Analytics problems is its overall difficulty relative to current state of the art analytic capabilities. A broader definition of Big Data Analytics problems is thus adopted by some (e.g., the National Institutes of Health (NIH)), to denote all analysis situations that press the boundaries or exceed the capabilities of the current state of the art in analytics systems and technology. According to this definition, "hard" analytics problems are de facto part of Big Data Analytics [3].

2. Types of Data Analysis:

The main types of data analytics [4] are:

a. Classification for Diagnostic or Attribution Analysis: where a typically computer-implemented system produces a table of assignments of objects into predefined categories on the basis of object characteristics.

Examples: medical diagnosis; email spam detection; separation of documents as responsive and unresponsive in litigation.

b. Regression for Diagnostic Analysis: where a typically computer-implemented system produces a table of assignments of numerical values to objects on the basis of object characteristics.

Examples: automated grading of essays; assignment of relevance scores to documents for information retrieval; assignment of probability of fraud to a pending credit card transaction.

c. Classification for Predictive Modeling: where a typically computer-implemented system produces a table of assignments of objects into predefined categories on the basis of object characteristics and where values address future states (i.e., system predicts the future).

Examples: expected medical outcome after hospitalization; classification of loan applications as risky or not with respect to possible future default; prediction of electoral results.

d. Regression for Predictive Modeling: where a typically computer-implemented system produces a table of assignments of numerical values to objects on the basis of object characteristics and where values address future states (i.e., system predicts the future).

Examples: predict stock prices at a future time; predict likelihood for rain tomorrow; predict likelihood for future default on a loan.

e. Explanatory Analysis: where a typically computer-implemented system produces a table of effects of one or more factors on one or more attributes of interest; also producing a catalogue of patterns or rules of influences.

Examples: analysis of the effects of sociodemographic features on medical service utilization, political party preferences or consumer behavior.

f. Causal Analysis: where a typically computer-implemented system produces a table or graph of causes-effect relationships and corresponding strengths of causal influences describing thus how specific phenomena causally affect a system of interest.

Example: causal graph models of how gene expression of thousands of genes interact and regulate development of disease or response to treatment; causal graph models of how socioeconomic factors and media exposure affect consumer propensity to buy certain products; systems that optimize the number of experiments needed to understand the causal structure of a system and manipulate it to desired states.

g. Network Science Analysis: where a typically computer-implemented system produces a table or graph description of how entities in a big system inter-relate and define higher level properties of the system.

Example: network analysis of social networks that describes how persons interrelate and can detect who is married to whom; network analysis of airports that reveal how the airport system has points of vulnerability (i.e., hubs) that are responsible for the adaptive properties of the airport transportation system (e.g., ability to keep the system running by rerouting flights in case of an airport closure).

h. Feature selection, dimensionality reduction and data compression: where a typically computer-implemented system selects and then eliminates all variables that are irrelevant or redundant to a classification/regression, or explanatory or causal modeling (feature selection) task;

or where such as system reduces a large number of variables to a small number of transformed variables that are necessary and sufficient for classification/regression, or explanatory or causal modeling (dimensionality reduction or data compression).

Example: in order to perform web classification into family-friendly ones or not, web site contents are first cleared of all words or content that is not necessary for the desired classification.

i. Subtype and data structure discovery: where analysis seeks to organize objects into groups with similar characteristics or discover other structure in the data.

Example: clustering of merchandize such that items grouped together are typically being bought together; grouping of customers into marketing segments with uniform buying behaviors.

j. Feature construction: where a typically computer-implemented system pre-processes and transforms variables in ways that enable the other goals of analysis. Such pre-processing may be grouping, abstracting, existing features or constructing new features that represent higher order relationships, interactions etc.

Example: when analyzing hospital data for predicting and explaining high-cost patients, co-morbidity variables are grouped in order to reduce the number of categories from thousands to a few dozen which then facilitates the main (predictive) analysis; in algorithmic trading, extracting trends out of individual time-stamped variables and replacing the original variables with trend information facilitates prediction of future stock prices.

k. Data and analysis parallelization, chunking, and distribution: where a typically computer-implemented system performs a variety of analyses (e.g., predictive modeling, diagnosis, causal analysis) using federated databases, parallel computer systems, and modularizes analysis in small manageable pieces, and assembles results into a coherent analysis.

Example: in a global analysis of human capital retention a world-wide conglomerate with 2,000 personnel databases in 50 countries across 1,000 subsidiaries, can obtain predictive models for retention applicable across the enterprise without having to create one big database for analysis.

Important note about terminology: in common everyday use (e.g., in common parlance, in the business analytics and even in parts of the scientific and technical literature) the term "predictive modeling" is used as general-purpose term for all analytic types a, b, c, d, e without discrimination. This is for narrative convenience since it is much less cumbersome to state, for example, that "method X is a predictive modeling method" as opposed to the more accurate but inconvenient "method X is a method that can be used for Classification for Diagnostic or Attribution Analysis, and/or Regression for Diagnostic Analysis, and/or Classification for Predictive Modeling, and/or Regression for Predictive Modeling, and/or Explanatory Analysis". In those cases it is inferred from context what is the precise type of analysis that X is intended for or was used etc.

The present application utilizes this simplifying terminological convention and refers to "predictive modeling" as the application field of the invention to cover analysis types a, b, c, d, and e.

3. Specific Examples of Data Analytics Application Areas:

The following Listing provides examples of some of the major fields of application for the invented system specifically, and Data Analytics more broadly [5]:

1. Credit risk/Creditworthiness prediction.
2. Credit card and general fraud detection.
3. Intention and threat detection.
4. Sentiment analysis.
5. Information retrieval, filtering, ranking, and search.
6. Email spam detection.
7. Network intrusion detection.
8. Web site classification and filtering.
9. Matchmaking.
10. Predict success of movies.
11. Police and national security applications
12. Predict outcomes of elections.
13. Predict prices or trends of stock markets.
14. Recommend purchases.
15. Online advertising.
16. Human Capital/Resources: recruitment, retention, task selection, compensation.
17. Research and Development.
18. Financial Performance.
19. Product and Service Quality.
20. Client management (selection, loyalty, service).
21. Product and service pricing.
22. Evaluate and predict academic performance and impact.
23. Litigation: predictive coding, outcome/cost/duration prediction, bias of courts, voire dire.
24. Games (e.g., chess, backgammon, jeopardy).
25. Econometrics analysis.
26. University admissions modeling.
27. Mapping fields of activity.
28. Movie recommendations.
29. Analysis of promotion and tenure strategies,
30. Intension detection and lie detection based on fMRI readings.
31. Dynamic Control (e.g., autonomous systems such as vehicles, missiles; industrial robots; prosthetic limbs).
32. Supply chain management.
33. Optimizing medical outcomes, safety, patient experience, cost, profit margin in healthcare systems.
34. Molecular profiling and sequencing based diagnostics, prognostics, companion drugs and personalized medicine,
35. Medical diagnosis, prognosis and risk assessment.
36. Automated grading of essays.
37. Detection of plagiarism.
38. Weather and other physical phenomena forecasting.

Finally, with respect to the types of data involved in data analytics typical examples are:

Structured data (e.g., financial, medical, insurance)
Unstructured data (e.g., www pages, textual reports, emails, images)
Hybrid, multi-format data (e.g., communications containing free text+structured attachments, medical records with structured lab tests and free text reports, images+meta data+text descriptions, etc.)

The focus of the present invention is parallelization chunking, and distributed analysis of Big Data. Typical application scenarios are:

I. Data may not reside in one database but alternatively exist in more non-identical databases (e.g., variables #1-100 in database 1 and variables #80-150 in database 2), and analysis has to take place in situ rather than combining all databases in one big database.

II. Data exceeding the working memory of the largest available computer and has to be broken into smaller pieces that need be analyzed separately and the results combined.

III. Data encompassing several distinct data types that have to be analyzed separately by methods specific to each data type, and the results combined.

IV. Data encompassing several distinct data types that have to be analyzed separately by analyst with knowledge/skills specific to each data type, and the results combined.

V. Data analysis that has to take place over time as new data is coming in and results are incrementally improved until analysis objectives are met, or no more data is available.

The present invention (BDP/M, standing for "Big Data Parallelization/Modularization" data analysis system and method) is implemented in general purpose digital computers and is capable of dealing with the above scenarios of Big Data analysis as well as any scenario where parallel, distributed, federated, chunked and serialized Big Data analysis is desired.

BRIEF DESCRIPTION OF THE FIGURES

FIG. 1 shows general description of the BDP/M method.

FIG. 2 shows admissibility criteria for optimal feature selection/data compression for predictive model construction.

FIG. 3 shows admissibility criteria for local causal neighborhood discovery.

FIG. 4 shows admissibility rules for extraction of all maximally predictive and non variable-compressible predictive models.

FIG. 5 shows example configuration: Federated GLL-MB, Federated GLL.

FIG. 6 shows PGLL1 method. PFor is a parallel For loop.

FIG. 7 shows PGLL2 method. PFor is a parallel For loop.

FIG. 8 shows structure discovery results. All methods perform the same.

FIG. 9 shows run-time results for methods. Time is given in seconds.

FIG. 10 shows area under ROC curve (AUC) for predicting various responses shown in FIG. 12. Darker shades correspond to more accurate and lighter shade to less accurate predictions.

FIG. 11 shows resulting number of selected features.

FIG. 12 shows responses and their encoding.

FIG. 13 shows classification performance in the testing set (measured by AUC) of BDP/M IAMB methods and comparator variable selection techniques for all classifiers. The number of variables selected by each method is also provided in the figure.

FIG. 14 shows running time of BDP/M IAMB methods.

DETAILED DESCRIPTION OF THE INVENTION

Figure 15:
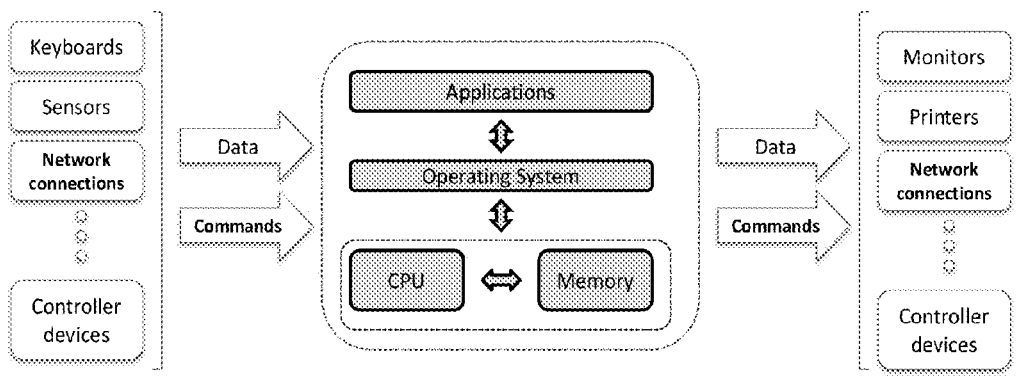
FIG. 15 shows the organization of a general-purpose modern digital computer system such as the ones used for the typical implementation of the invention.

The invention is described in the form of a general process that is configured with pre-specified problem-specific configurations and is implemented in a general-purpose computer system.

A set of configuration rules ("admissibility criteria") provide sufficient (but not necessary) requirements that, when followed, guarantee that the overall analysis results will meet accuracy, compactness, causal interpretability and other desirable performance operating characteristics.

The process gives rise to entirely new, and very powerful analysis capabilities previously not attainable with the state of the art.

Without exhausting the many ways that the process can be configured to individual analysis needs, the general invented method BDP/M and computer system can be configured, for example, to perform the following types of Big Data analyses:

1. Analyses where the data is federated in many sites and local datasets without having to bring all the data in a single dataset (e.g., invention configurations: Federated GLL-MB, Federated GLL)

2. Analyses where the data exists in a single dataset but it is broken down by the inventive method to many smaller datasets so that it can be analyzed more efficiently in massively parallel computer systems. (e.g., invention configurations: Large Grain Parallel GLL-MB, Large Grain Parallel GLL-PC).

3. Analyses where the data is so large that it cannot fit in a single computer and is broken down by the inventive method to smaller pieces, each fitting the available computer capacity, so that analysis can take place in a serialized manner. (e.g., invention configurations: Serialized IAMB, Serialized GLL-PC).

4. Analyses where the characteristics of the data (e.g., distributional form, connectivity of underlying causal generative process) is such that analysis cannot be accomplished efficiently in a single computer and is broken down by the inventive method to smaller pieces so that analysis can be carried out by massively parallel computer systems. (e.g., invention configurations: Fine Grain Parallel GLL-MB, Fine Grain Parallel GLL-PC).

5. Analyses where the data exists or is split by the inventive method into many datasets (each corresponding to a specific type of data) and then each dataset is analyzed by separate human analysts who specialize in individual data types. (e.g., invention configurations: Multi-modal hBDP/M).

6. Analyses where the data exists or is split by the inventive method into many datasets (each corresponding to a specific type of data) and then each dataset is analyzed by separate devices specializing in individual data types. (e.g., invention configurations: Multi-modal cBDP/M).

7. Analyses where for reasons of efficiency, cost or performance, large parts of modeling are done by "crowdsourcing" to many analysts.

8. Analyses where the data exists or is split by the inventive method into many datasets and then each dataset is analyzed by separate compute nodes to extract all target information equivalence sets for Markov boundary or local causal induction (e.g., invention configurations: Parallel TIE*, Federated TIE*).

The general description of the BDP/M method is given in FIG. 1. If the sufficient (but not necessary) admissibility criteria (i.e., configuration rules) described in FIGS. 2-4 hold, then the process will output correct outputs for the modeling goals of:

optimal feature selection/data compression for predictive model construction (i.e., extraction of at least a single Markov Boundary), local causal neighborhood discovery (i.e., direct causes and effects and possibly including direct causes of direct effects as well), extraction of all maximally predictive and reducible predictive models, extraction of all statistically indistinguishable local causal neighborhood variables sets.

However, if the admissibility criteria stated in FIGS. 2-4 do not hold, the process may still output correct results and/or heuristically useful results.

A number of configurations can be similarly obtained to parallelize and modularize the GLL-PC and GLL-MB methods (Large Grain Parallel GLL-MB, Large Grain Parallel GLL-PC), to serialize the IAMB and PC methods (Serialized IAMB, Serialized GLL-PC), to parallelize the GLL-PC and GLL-MB methods (Fine Grain Parallel GLL-MB, Fine Grain Parallel GLL-PC), to allow analysis of multi-model data by humans (Multi-modal hBDP/M) or computer methods (Multi-modal cBDP/M), to "crowd-source" analysis to many analysts, and many other modeling and analysis techniques entailed by and following the method description.

Description & Empirical Performance of Example BDP/M Configurations & Variants

The example configurations, Federated GLL and Federated GLL-MB are shown in FIG. 5.

Another configuration of the method, PGLL1, is shown in FIG. 6. PGLL1 parallelizes Semi-Interleaved HITON-PC, an instance of the GLL method. Its major difference from Semi-Interleaved HITON-PC is organization of the loops in the forward phase—it iterates through all eligible variables as many times as there are updates of the tentative Markov boundary set (M) (unlike Semi-Interleved HITON-PC that iterates through eligible variables only once when considering them for inclusion).

The method PGLL2 shown in FIG. 7 is a modification of PGLL1 that is suitable for a more efficient implementation of the conditional independence test that assesses independence of many variables with T given a single conditioning set. Specifically, PGLL1 and PGLL2 differ in how they perform conditional independence tests. PGLL1 loops over all variables and conditioning sets and tests for independence one variable/conditioning set at a time. PGLL2 uses a vectorized form of the independence test, where all variables are tested at once given a conditioning set. Hence there is only a need to loop over conditioning sets. PGLL2 parallelizes the loop over conditioning sets using parallel processes on a CPU. Another method configuration named PGLL3 is the same as PGLL2 except for it parallelizes using a GPU.

Empirical Testing and Demonstration.

The above methods were empirically tested on resimulated gene expression data using the transcriptional networks of E coli and Yeast. The variable of interest (the Markov boundary of which we want to discover) for E coli was TF1245, with a local neighborhood of 54 genes. For Yeast it was TF1201, with a local neighborhood of 300 genes. As expected, all methods gave the same structure recovery performance, which is shown in FIG. 8. FIG. 9 reports the computation time of each of the methods in seconds.

Results and observations of empirical experiments are given below:

The PGLL1 method without parallelization (i.e. executed on single core) provides similar performance to the regular Semi-Interleaved HITON-PC method.

The PGLL2 method without parallelization (i.e. executed on single core) provides a significant speedup (3× to 6× faster).

PGLL2 run in parallel on 6 cores provides an increase in speed over single-core PGLL2 of about 3×-6×. The increase is more pronounced for max-K=3, which involves more conditioning sets.

For PGLL3, we had to break the GFOR loops into batches. For E coli, we tried batch sizes of 1000 and 500. Batch size 1000 caused out of memory errors so we report results for batch size 500. For Yeast, we tried batch sizes of 1000, 500, 250 and 100. All of these except for 100 caused out of memory errors.

For E coli, the times are similar for PGLL2 on 6 cores and on the GPU. For Yeast, the GPU is faster for max-K=2 but the CPU is faster for max-K=3.

For Yeast/max-K=3, the GPU is faster than the parallel CPU during the forward phase but slower during the backward phase.

Analysis of Multi-Modal Data Using BDP/M.

Figure 10:
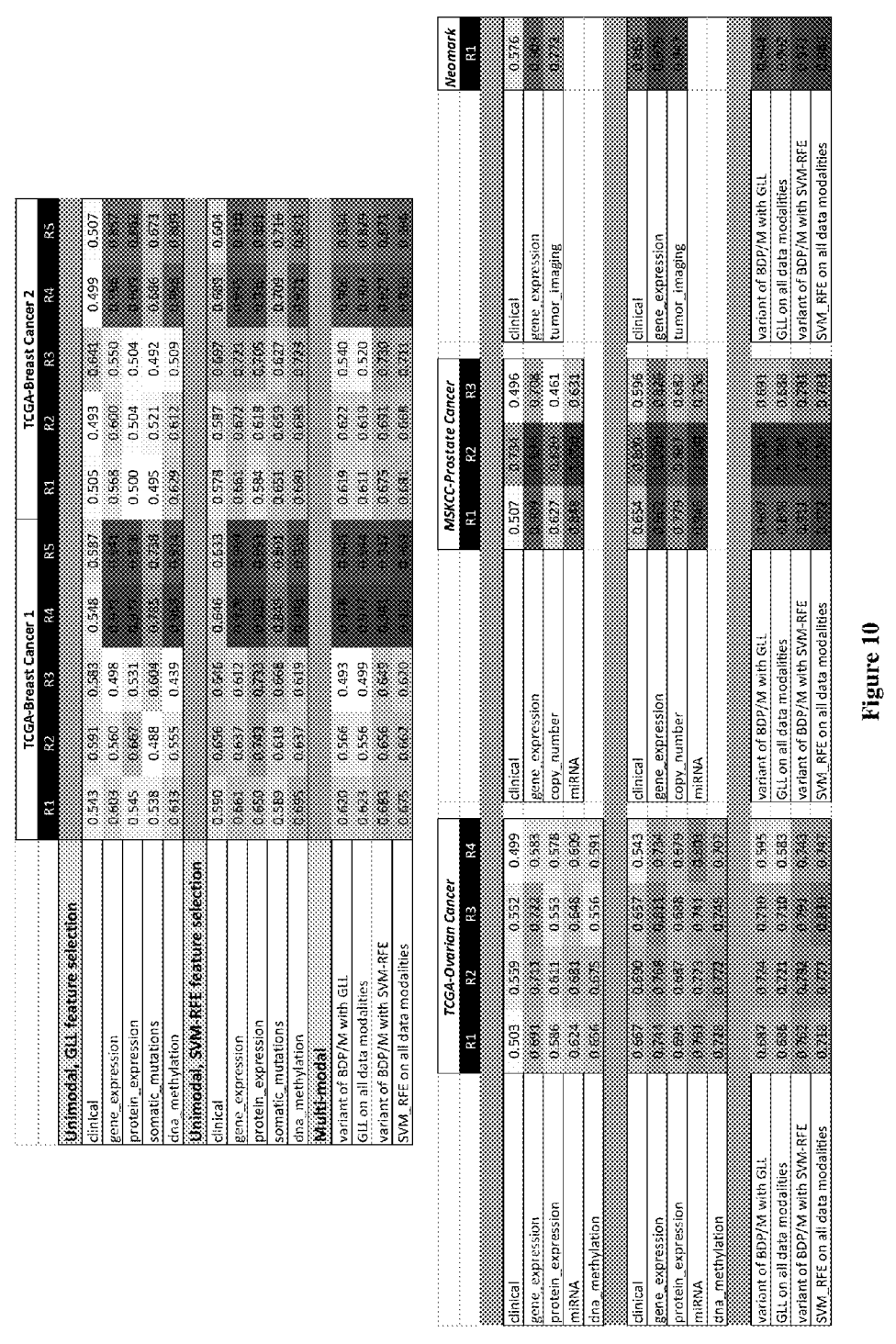

A simplified variant of Multimodal BDP/M (where the combination step is omitted) was tested such that each data modality is processed differently either with GLL [6] or SVM-RFE [7]. The latter method (SVM-RFE) is a heuristic feature selection technique. FIG. 12 shows the response variables that analysis was seeking to predict. FIG. 10 shows resulting area under ROC curve (AUC) (best over SVM [8], Random forests [9], Kernel ridge regression [10], and Bayesian logistic regression [11] methods for classification).

FIG. 11 shows numbers of selected features. Classifiers are trained and features are selected inside a cross-validation protocol. AUC is estimated on the testing data during cross-validation.

FIG. 13 shows classification performance in the testing set (measured by AUC) of BPD/M IAMB methods and comparator variable selection techniques for all classifiers. The number of variables selected by each method is also provided in the figure. FIG. 14 shows running time of BPD/M IAMB methods.

Method and System Output, Presentation, Storage, and Transmittance

The relationships, correlations, and significance (thereof) discovered by application of the method of this invention may be output as graphic displays (multidimensional as required), probability plots, linkage/pathway maps, data tables, and other methods as are well known to those skilled in the art. For instance, the structured data stream of the method's output can be routed to a number of presentation, data/format conversion, data storage, and analysis devices including but not limited to the following: (a) electronic graphical displays such as CRT, LED, Plasma, and LCD screens capable of displaying text and images; (b) printed graphs, maps, plots, and reports produced by printer devices and printer control software; (c) electronic data files stored and manipulated in a general purpose digital computer or other device with data storage and/or processing capabilities; (d) digital or analog network connections capable of transmitting data; (e) electronic databases and file systems. The data output is transmitted or stored after data conversion and formatting steps appropriate for the receiving device have been executed.

Software and Hardware Implementation

Due to large numbers of data elements in the datasets, which the present invention is designed to analyze, the invention is best practiced by means of a general purpose digital computer with suitable software programming (i.e., hardware instruction set) (FIG. 15 describes the architecture of modern digital computer systems). Such computer systems are needed to handle the large datasets and to practice the method in realistic time frames. Based on the complete disclosure of the method in this patent document, software code to implement the invention may be written by those reasonably skilled in the software programming arts in any one of several standard programming languages including, but not limited to, C, Java, and Python. In addition, where applicable, appropriate commercially available software programs or routines may be incorporated. The software program may be stored on a computer readable medium and implemented on a single computer system or across a network of parallel or distributed computers linked to work as one. To implement parts of the software code, the inventors have used MathWorks Matlab® and a personal computer with an Intel Xeon CPU 2.4 GHz with 24 GB of RAM and 2 TB hard disk.

REFERENCES

1. Davenport T H, Harris J G: Competing on analytics: the new science of winning: Harvard Business Press; 2013.
2. Douglas L: The Importance of 'Big Data': A Definition. *Gartner (June 2012)* 2012.
3. NIH Big Data to Knowledge (BD2K) [http://bd2k.nih.gov/about_bd2k.html#bigdata]
4. Provost F, Fawcett T: Data Science for Business: What you need to know about data mining and data-analytic thinking: "O'Reilly Media, Inc."; 2013.
5. Siegel E: Predictive Analytics: The Power to Predict Who Will Click, Buy, Lie, or Die: John Wiley & Sons; 2013.
6. Aliferis C F, Statnikov A, Tsamardinos I, Mani S, Koutsoukos X D: Local Causal and Markov Blanket Induction for Causal Discovery and Feature Selection for Classification. Part I: Algorithms and Empirical Evaluation. *Journal of Machine Learning Research* 2010, 11:171-234.
7. Guyon I, Weston J, Barnhill S, Vapnik V: Gene selection for cancer classification using support vector machines. *Machine Learning* 2002, 46(1):389-422.
8. Vapnik V N: Statistical learning theory. New York: Wiley; 1998.
9. Breiman L: Random forests. *Machine Learning* 2001, 45(1):5-32.
10. Hastie T, Tibshirani R, Friedman J H: The elements of statistical learning: data mining, inference, and prediction. New York: Springer; 2001.
11. Genkin A, Lewis D D, Madigan D: Large-scale Bayesian logistic regression for text categorization. *Technometrics* 2007, 49(3):291-304.
12. Tsamardinos I, Aliferis C F: Towards principled feature selection: relevancy, filters and wrappers. *Proceedings of the Ninth International Workshop on Artificial Intelligence and Statistics (AI & Stats)* 2003.
13. Tsamardinos I, Aliferis C F, Statnikov A: Algorithms for large scale Markov blanket discovery. *Proceedings of the Sixteenth International Florida Artificial Intelligence Research Society Conference (FLAIRS)* 2003: 376-381.
14. Spirtes P, Glymour C N, Scheines R: Causation, prediction, and search, vol. 2nd. Cambridge, Mass.: MIT Press; 2000.
15. Pearl J: Causality: models, reasoning, and inference. Cambridge, U.K: Cambridge University Press; 2000.

We claim:
1. A computer-implemented method for parallel or distributed predictive, causal and feature selection analysis of Big Data comprising the following steps:
   a) initializing dataset D, variables V, response variable T, and parameter max-k (maximum size of the conditioning set) with a non-negative integer, as defined by a user;
   b) initializing M with an empty set;
   c) initializing E with all variables excluding T;
   d) initializing the conditioning subset C[1] with an empty set;
   e) repeating the following steps e(1)-e(7) until the exit condition is met;
      (1) iterating in parallel or distributed fashion over variables X in E and conditioning subsets in C;
         (a) if T becomes statistically independent of X given some conditioning subset C[i], removing X from E;
      (2) if max-k is equal to zero, assigning E to M, outputting M, and terminating;
      (3) if E is empty, exiting from the iterative loop and proceeding to step f below;
      (4) selecting a variable Y that maximizes association with T over variables in E;
      (5) assigning to C all subsets of M of size up to max-k−1, union with the variable Y;
      6) adding Y to M;
      (7) removing Y from E;
   f) iterating in parallel or distributed fashion over variables X in M;
      (1) assigning to C all non-empty subsets of M excluding X of size up to max-k;
         (a) iterating in parallel or distributed fashion over conditioning subsets in C;
            (i) if T becomes statistically independent of X given some conditioning subset C[i], removing X from M; and
   g) outputting M.
2. The computer implemented method of claim 1 where M is initialized with a user-define subset of variables in step b.
3. The computer implemented method of claim 1 where E is initialized with a user-define subset of variables in step c.
4. The computer implemented method of claim 1 where a variable Y is selected from E by another user-defined heuristic function in step e(4).
5. A computer-implemented method for parallel or distributed predictive, causal and feature selection analysis of Big Data comprising the following steps:
   a) initializing dataset D, variables V, response variable T, and parameter max-k (maximum size of the conditioning set) with a non-negative integer, as defined by a user;
   b) initializing M with an empty set;
   c) initializing E with all variables excluding T;
   d) initializing the conditioning subset C[1] with an empty set;
   e) repeating the following steps e(1)-e(9) until the exit condition is met;
      (1) initializing R with an empty set;
      (2) iterating in parallel or distributed fashion over conditioning subsets in C;
         (a) Adding to R all variables X from E that are rendered statistically independent of T given a conditioning subset C[i];
      (3) removing from E variables R;

(4) if max-k is equal to zero, assigning E to M, outputting M, and terminating;
(5) if E is empty, exiting from the iterative loop and proceeding to step f below;
(6) selecting a variable Y that maximizes association with T over variables in E;
7) assigning to C all subsets of M of size up to max-k−1, union with the variable Y;
(8) adding Y to M;
(9) removing Y from E;
f) assigning to C all non-empty subsets of M excluding X of size up to max-k;
g) assigning an empty set to R;
h) iterating in parallel or distributed fashion over all conditioning subsets in C;
(1) Adding to R all variables X from M excluding the conditioning subset C[i] that are rendered statistically independent of T given the conditioning subset C[i];
i) removing R from M; and
j) outputting M.

6. The computer implemented method of claim 5 where M is initialized with a user-defined subset of variables in step b.

7. The computer implemented method of claim 5 where E is initialized with a user-defined subset of variables in step c.

8. The computer implemented system and general method of claim 5 where a variable Y is selected from E by another user-defined heuristic function in step e)(6).

9. A computer-implemented method for parallel, distributed, serialized, or chunked analysis of Big Data for predictive modeling, causal and/or feature selection with Markov Blanket induction comprising the following steps:
a) selecting an analysis goal from Markov Boundary induction, local causal neighborhood discovery, or multiple Markov Boundary induction and inputting a dataset D, a set of analysis modules A;
(1) selecting one of the following application dataset distribution types and analysis modules corresponding to whether the analysis is for Markov Boundary induction, local causal neighborhood discovery, or multiple Markov Boundary induction, which if followed will yield a correct result, otherwise employ alternative choices of data distribution and analysis modules;
(a) Admissible configurations to guarantee optimal feature selection/data compression for predictive model construction being:
(i) Distribution of Data: all faithful distributions;
(ii) Analysis modules set A: any proper Markov Boundary induction method (e.g., GLL-MB, IAMB);
(b) Admissible configurations to guarantee correct local casual neighborhood discovery beings:
(i) Distribution of Data: all locally faithful distributions with local causal sufficiency;
(ii) Analysis modules set A: any proper local causal induction method (e.g., GLL-PC, PC, IC*, FCI);
(c) Admissible configurations to guarantee correct extraction of all maximally predictive and non variable-compressible predictive models beings:
(i) Distribution of Data: all distributions were faithfulness holds except for violations of the intersection property;
(ii) Analysis modules set A: any proper multiple Markov Boundary induction method (e.g., TIE* method instantiations;
b) dividing D into n subsets Di according to a Distribution Sub-Procedure implemented in a corresponding module;
c) extracting subsets of datasets Di, denoted by di from each dataset Di and using di to create new enhanced datasets $Di^j$ for all datasets Di according to a Mixing Sub-Procedure that is implemented in a corresponding module;
(1) selecting one of the following distribution and mixing sub-procedures corresponding to whether the analysis is for Markov Boundary induction, local causal neighborhood discovery, or multiple Markov Boundary induction, which if followed will yield a correct result, otherwise employ alternative choices of mixing sub-procedure module;
(a) Admissible configurations of Distribution and Mixing Sub-Procedures to guarantee optimal feature selection/data compression for predictive model construction being:
(i) Data Distribution Sub-Process: create union of all $Di^j$ forms D;
(ii) Ensure one-to-one correspondence of each observable unit in each Di;
(iii) Mixing Sub-Process: extract $MBi^j$ from each $Di^j$ via Analysis module in A and Add $MBi^{(j-1)}$ to each $Di^{(j-1)}$ to form Di;
(b) Admissible configurations of Distribution and Mixing Sub-Procedures to guarantee correct local causal neighborhood discovery being:
(i) Data Distribution Sub-Process: union of all $Di^j$ forms D, One-to-one correspondence of each observable unit in each Di;
(ii) Mixing Sub-Process: extract $LNi^j$ from each $Di^j$ via Analysis module in A and Add $LNi^{(j-1)}$ to each $Di^{(j-1)}$ to form $Di^j$;
(c) Admissible configurations of Distribution and Mixing Sub-Procedures to guarantee correct extraction of all maximally predictive and non variable-compressible predictive models being:
(i) Data Distribution Sub-Process: create union of all $Di^j$ forms D, Ensure one-to-one correspondence of each observable unit in each Di;
(ii) Mixing Sub-Process: extract the set of $MBi^j$ from each $Di^j$ via Analysis module in A Add the set $MBi^{(j-1)}$ to each $Di^{(j-1)}$ to form $Di^j$;
d) analyzing each dataset $Di^j$ using analysis modules implemented in analysis modules A;
e) repeating steps b) to d) according to an Iterative Enhancement Sub-Procedure that is implemented in a corresponding module and also contains termination and performance criteria;
(1) selecting one of the following Iterative Enhancement Sub-Procedures corresponding to whether the analysis is for Markov Boundary induction, local causal neighborhood discovery, or multiple Markov Boundary induction, which if followed will yield a correct result, otherwise employ alternative choices of Iterative Enhancement Sub-Procedure module;
(a) Admissible configurations of Iterative Enhancement Sub-Procedure to guarantee optimal feature selection/data compression for predictive model construction being:
(i) Terminate at or after smallest number of iterations that guarantees no false negatives and no false positives are produced by application of local Markov Boundary analyses;
(b) Admissible configurations of Iterative Enhancement Sub-Procedure to guarantee correct local causal neighborhood discovery being:
(i) Terminate at or after smallest number of iterations that guarantees no false negatives and no false positives are produced by application of local causal neighborhood analyses;
(c) Admissible configurations of Iterative Enhancement Sub-Procedure to guarantee correct extraction of all maximally predictive and non variable-compressible predictive models being:
(i) Terminate at or after smallest number of iterations that guarantees no false negatives and no false positives are produced by application of local multiple Markov Boundary analyses;
f) combining results from individual $Di^j$ using a Combinator Sub-Procedure, that is implemented in a corresponding module, outputting results and terminating.

10. The computer implemented method of claim 9 where the method is configured for Markov boundary discovery where the data exists in a number of datasets comprising a federated database ("Federated GLL-MB"):
a) using the natural fragmentation of federated database D in n local databases Di denoted at first interation as $Di^1$;
b) aligning training instances among Di using an appropriate key serving as training instance unique identifier;
c) analyzing each dataset $Di^1$ with the GLL-MB method to produce n local Markov Boundaries $MBi^1$;
d) combining results by running GLL-MB on the union of $MBi^1$ to derive $MB^1$;
e) add to each $Di^1$ the set $MB^1$ to derive datasets $Di^2$;
f) analyzing each dataset $Di^2$ with the GLL-MB method to produce n local Markov Boundaries $MBi^2$ (in the second iteration of analysis);
g) combining results by running GLL-MB on the union of $MBi^2$ to derive $MB^2$;
h) terminating upon 2 iterations and outputting result $MB^2$ to user.

11. The computer implemented method of claim 9 where the method is configured for Markov boundary discovery and where the data exists in a single dataset but it is broken down by the inventive method to many smaller datasets so that it can be analyzed more efficiently in massively parallel computer systems ("Large Grain Parallel GLL-MB"):
a) dividing the original database D in k smaller sub-datasets Di, where k is the number of processing nodes in a parallel computer and such as the union of Di is D and each sub-dataset is denoted at first iteration as $Di^1$;
b) analyzing at first iteration each dataset $Di^1$ with the GLL-MB method to produce k local Markov Boundaries $MBi^1$;
c) combining results by running GLL-MB on the union of $MBi^1$ to derive $MB^1$;
d) adding to each $Di^1$ the set $MB^1$ to derive datasets $Di^2$;
e) analyzing each dataset $Di^2$ with the GLL-MB method to produce k local Markov Boundaries $MBi^2$ (in the second iteration of analysis);
f) combining results by running GLL-MB on the union of $MBi^2$ to derive $MB^2$;
g) terminating upon 2 iterations and outputting result $MB^2$ to user.

12. The computer implemented method of claim 9 where the method is configured for Markov boundary discovery and where the data is so large that it cannot fit in a single computer and is broken down by the inventive method to smaller pieces, each fitting the available computer capacity, so that analysis can take place in a serialized manner ("Serialized IAMB", "Serialized GLL-MB"):
a) dividing the original database D in j smaller sub-datasets Di, where j is chosen to be the smallest number of equal part of D so that every Di fits the memory of the available computer and such that their union is D, with each sub-dataset denoted at first iteration as $Di^1$;
b) analyzing at first iteration each dataset $Di^1$ serially with GLL-MB, or IAMB to produce j Markov Boundaries $MBi^1$;
c) combining results by running GLL-MB, or IAMB on the union of $MBi^1$ to derive $MB^1$;
d) adding to each $Di^1$ the set $MB^1$ to derive datasets $Di^2$;
e) analyzing at second iteration each dataset $Di^2$ serially with the GLL-MB or IAMB method to produce j local Markov Boundaries $MBi^2$ (in the second iteration of analysis);
f) combining results by running GLL-MB or IAMB on the union of $MBi^2$ to derive $MB^2$;
g) terminating upon 2 iterations and outputting result $MB^2$ to user.

13. The computer implemented method of claim 9 where the method is configured for Markov boundary discovery and where the data is so large that it cannot fit in a single computer and is broken down by the inventive method to smaller pieces, each fitting the available computer capacity, so that analysis can take place in a serialized manner ("Serialized IAMB", "Serialized GLL-MB"):
a) dividing the original database D in j smaller sub-datasets Di, where j is chosen to be the smallest number of equal part of D so that every Di fits the memory of the available computer and such that their union is D, with each sub-dataset denoted at first iteration as $Di^1$;
b) analyzing at first iteration each dataset $Di^1$ serially with GLL-MB, or IAMB to produce j Markov Boundaries $MBi^1$;
c) before analyzing each $Di^1$, adding to each $Di^1$ the set $MB(i-1)^1$;
d) $MB0^1$ being set to the empty set;
e) analyzing at second iteration each dataset $Di^2$ serially with GLL-MB, or IAMB to produce j Markov Boundaries $MBi^2$;
f) before analyzing each $Di^2$, adding to each $Di^2$ the set $MB(i-1)^2$;
g) $MB0^2$ being set to $MBj^1$;
h) terminating upon 2 iterations and outputting result $MBj^2$ to user.

14. The computer implemented method of claim 9 where the method is configured for causal discovery and where the data is so large that it cannot fit in a single computer and is broken down by the inventive method to smaller pieces, each fitting the available computer capacity, so that analysis can take place in a serialized manner ("Serialized GLL-PC"):
a) Dividing the original database D in j smaller sub-datasets Di, where j is chosen to be the smallest number of equal parts of D so that every Di fits the memory of the available computer and such that their union is D;
b) analyzing each dataset Di serially with GLL-PC to produce Local Causal Neighborhoods LNi;
c) before analyzing each Di, adding to each Di the $LN_{(i-1)}$;
d) terminating and outputting result LNj to user.

15. The computer implemented method of claim 9 where the method is configured for multiple Markov boundary or multiple causal neighborhood discovery where the data exists in a number of datasets comprising a federated database ("Federated TIE*") in accordance with the admissibility criteria for multiple Markov Boundary extraction:
   a) using the natural fragmentation of federated database D in n local databases Di denoted at first iteration as $Di^1$;
   b) using an appropriate key serving as training instance unique identifier to align training instances among Di;
   c) instantiating TIE* generative method to use Markov Boundary or local causal neighborhood sub-process methods depending on whether user requires full Markov Boundaries (comprising local causal neighborhoods and spouse variables) or approximate Markov Boundaries (comprising only local causal neighborhoods) per the specification of the TIE* method;
   d) analyzing each dataset Di1 with the instantiated TIE* method to produce n sets of local Markov Boundaries or local causal neighborhood sets $MBi^1$;
   e) combining results by running TIE* on the union of $MBi^1$ to derive the set of Markov Boundaries or local causal neighborhoods $MB^1$;
   f) if local causal neighborhoods are required by the user, then terminating and outputting result $MB^1$ to user; otherwise if multiple Markov Boundaries are required by user, continuing with second iteration;
   g) adding to each $Di^1$ the set $MB^1$ to derive datasets $Di^2$;
   h) analyzing each dataset $Di^2$ with the instantiated TIE* method to produce n sets of local Markov Boundaries sets $MBi^2$ (in the second iteration of analysis);
   i) combining results by running the instantiated TIE* on the union of $MBi^2$ to derive the set of Markov Boundaries $MB^2$; and
   j) terminating upon 2 iterations and outputting result $MB^2$ to user.

16. The computer implemented method of claim 10 where the method is configured for local causal discovery where the data exists in a number of datasets comprising a federated database ("Federated GLL-PC"): by using GLL-PC instead of GLL-MB and by terminating after one iteration only.

17. The computer implemented method of claim 11 where the method is configured for local causal discovery and where the data exists in a single dataset but it is broken down by the inventive method to many smaller datasets so that it can be analyzed more efficiently in massively parallel computer systems ("Large Grain Parallel GLL-PC"): by using GLL-PC instead of GLL-MB and by terminating after one iteration only.

18. The computer implemented method of claim 10 where the method is configured for Markov boundary discovery where the data exists in a number of datasets comprising a federated database and each component dataset corresponds to a distinct data type ("Multimodal MB cBDP/M").

19. The computer implemented method of claim 11 where each dataset Di is assigned to a human analyst for purposes of managing a crowdsourcing of analysis to many analysts.

20. The computer implemented method of claim 15 where data is not naturally federated but divided by the method into equal parts to be analyzed by corresponding compute nodes in a parallel processing system ("Parallel TIE*").

21. The computer implemented method of claim 16 where the method is configured for local causal discovery where the data exists in a number of datasets comprising a federated database and each component dataset corresponds to a distinct data type ("Multimodal PC cBDP/M").

22. The computer implemented method of claim 18 where the method is configured for Markov boundary discovery where the data exists in a number of datasets comprising a federated database and each component dataset corresponds to a distinct data type that is analyzed by a human expert with specialized skills for the corresponding type of data ("Multimodal MB hBDP/M").

23. The computer implemented method of claim 21 where the method is configured for local causal discovery where the data exists in a number of datasets comprising a federated database and each component dataset corresponds to a distinct data type that is analyzed by a human expert with specialized skills for the corresponding type of data ("Multimodal PC hBDP/M").

24. The computer implemented method of claim 17 where each dataset Di is assigned to a human analyst for purposes of managing a crowdsourcing of analysis to many analysts.

* * * * *